(12) United States Patent
Lester et al.

(10) Patent No.: US 9,716,375 B1
(45) Date of Patent: Jul. 25, 2017

(54) METHOD OF FABRICATING A PROTECTIVE COVER FROM FOIL-BACKED FIBERGLASS SUBSTRATE

(71) Applicants: Michael E. Lester, Burton, OH (US); Michael John Williams, Landrum, SC (US); Matthew John Williams, Chagrin Falls, OH (US)

(72) Inventors: Michael E. Lester, Burton, OH (US); Michael John Williams, Landrum, SC (US); Matthew John Williams, Chagrin Falls, OH (US)

(73) Assignee: Electrolock, Inc., Duncan, SC (US)

( * ) Notice: Subject to any disclaimer, the term of this patent is extended or adjusted under 35 U.S.C. 154(b) by 0 days.

(21) Appl. No.: 15/014,754

(22) Filed: Feb. 3, 2016

(51) Int. Cl.
| | | |
|---|---|---|
| *H01R 43/04* | (2006.01) | |
| *H02G 3/04* | (2006.01) | |
| *H01B 7/29* | (2006.01) | |
| *H01B 7/18* | (2006.01) | |

(52) U.S. Cl.
CPC ............ *H02G 3/0481* (2013.01); *H01B 7/18* (2013.01); *H01B 7/29* (2013.01); *H02G 3/0418* (2013.01); *Y10T 29/49194* (2015.01)

(58) Field of Classification Search
CPC . B32B 1/08; B32B 2597/00; B32B 2260/021; Y10T 29/49826; Y10T 29/49194; Y10T 403/725; F16L 57/00
USPC .................. 29/871, 423, 447, 458, 515, 868
See application file for complete search history.

(56) References Cited

U.S. PATENT DOCUMENTS

| | | | |
|---|---|---|---|
| 290,831 | A | 12/1883 | Allen |
| 2,012,108 | A | 8/1935 | Raney |
| 2,783,173 | A | 2/1957 | Walker et al. |
| 2,858,854 | A | 11/1958 | Daggett |
| 3,434,502 | A | 3/1969 | Snelling |
| 3,524,779 | A | 8/1970 | Masters et al. |
| 3,980,107 | A | 9/1976 | Barnes |
| 4,417,603 | A | 11/1983 | Argy |
| 5,053,582 | A | 10/1991 | Terakawa et al. |
| 5,190,810 | A | 3/1993 | Kirschbaum et al. |
| 5,603,358 | A | 2/1997 | Lepoutre |
| 5,718,956 | A | 2/1998 | Gladfelter et al. |
| 6,244,756 | B1 * | 6/2001 | Bloom ................ G02B 6/2551 385/80 |
| 7,186,038 | B2 * | 3/2007 | Hovland .............. G02B 6/4471 385/139 |

(Continued)

FOREIGN PATENT DOCUMENTS

WO        0210633 A1     2/2002

*Primary Examiner* — Thiem Phan
(74) *Attorney, Agent, or Firm* — Smith Moore Leatherwood LLP; Thomas W. Epting (57) ABSTRACT

A protective cover for cable connectors and methods of fabricated the protective cover. The protective cover comprises a tube open at one end and substantially closed at the opposed end by an end cap. The end cap bears an opening formed by slits, or by a combination of an open hole in addition to slits. The protective cover has a foil outer layer, a soft felt inner layer, and an insulating fiberglass core between the outer and inner layers. The tube is made by overlappingly rolling and bonding a section of foil-backed fiberglass. The end cap may be separately made, made as part of the pattern for the tube, or may be formed by cutting pointed teeth into one end of the tube pattern and bonding them generally perpendicularly to the length of the tube.

15 Claims, 5 Drawing Sheets

(56) References Cited

U.S. PATENT DOCUMENTS

| | | |
|---|---|---|
| 7,331,504 B2 | 2/2008 | Languillat et al. |
| 7,410,550 B2 | 8/2008 | Sherwin |
| 2003/0198806 A1 | 10/2003 | Samson-Himmelstjerna et al. |
| 2004/0185205 A1 | 9/2004 | van de Camp |
| 2005/0129884 A1 | 6/2005 | Jones |
| 2005/0260365 A1 | 11/2005 | Niu et al. |
| 2006/0141179 A1 | 6/2006 | van de Camp |
| 2007/0173156 A1 | 7/2007 | Kulper et al. |
| 2008/0286568 A1 | 11/2008 | Kopf et al. |
| 2009/0098324 A1 | 4/2009 | Hasegawa et al. |
| 2010/0236827 A1 | 9/2010 | Doi et al. |

\* cited by examiner

METHOD OF FABRICATING A PROTECTIVE COVER FROM FOIL-BACKED FIBERGLASS SUBSTRATE

FIELD OF THE DISCLOSURE

The present disclosure relates to a protective cover for connectors, sensors, and other components used with electrical cables and the like.

BACKGROUND

In certain applications, it may be desirable to protect connectors, sensors, and other components for electrical cables, hoses, tubing, piping, tension cabling, etc., from heat and abrasion, and perhaps to a lesser extent from vibration, particularly in environments where elevated temperatures and/or vibration are present, such as may be in the case of engine or motor compartments in vehicles and/or in other industrial, commercial, aerospace, and/or marine applications.

Therefore, it may be desirable to have devices and methods that take into account the issues discussed above, as well as possibly other issues.

BRIEF SUMMARY

The following is a non-exhaustive list of examples, which may or may not be claimed, of the subject matter according the present disclosure.

According to example implementations of the present disclosure, concepts are set forth regarding protective cover, which could serve a temperature insulating cover, for cables and associated connectors, sensors and components, and methods of fabricating the protective cover. In certain implementations, the protective cover comprises a tube open at one end and substantially closed at the opposed end by an end cap, and the end cap includes an opening formed by slits, or by a combination of a permanently open hole in addition to slits. The end cap has a foil outer layer, a soft felt inner layer, and an insulating core, which could be fiberglass or some other suitable material, between the outer and inner layers. The central opening in the end cap is adapted to receive one or more electric or optical cables, fluid hoses, tubing, tension cables, or the like. The tube is of greater diameter than the central opening and is intended to slide over an electrical connector, sensor, fluid valve, or other component.

In one example implementation, the protective cover according to at least one aspect of the disclosure is applied to electrical conductors and associated connectors and/or sensors in the motor and/or engine compartment of motor vehicles.

According to other example implementations of the present disclosure, methods of fabricating a protective cover from pre-fabricated foil-backed fiberglass (or other suitable material) are set forth. In one such implementation, the foil-backed fiberglass is cut to a desired size, lined with felt, and rolled or wound into a tube with approximately ten to forty percent overlap, and bonded. An end cap is then applied and bonded in place. The end cap, also lined with felt, may be made as a component hinged to the pattern of initial foil-backed fiberglass, or may be made separately from that used to form the tube.

In a further method implementation, a pattern for the tube may be cut to include pointed portions, or teeth, which are folded to close the tube. Bonding the teeth together along part of their length enables the unbonded portions to be pushed aside as a cable is passed therethrough, thereby allowing the unbonded portions to tend to close over the cable, thereby generally closing one end of the tube.

The features, functions and advantages discussed herein may be achieved independently in various example implementations or may be combined in yet other example implementations, further details of which may be seen with reference to the following description and drawings.

BRIEF DESCRIPTION OF THE DRAWINGS

Various objects, features, and attendant advantages of the disclosed concepts will become more fully appreciated as the same becomes better understood when considered in conjunction with the accompanying drawings, which are not necessarily drawn to scale, in which like reference characters designate the same or similar parts throughout the several views, and wherein.

Each figure shown in this disclosure shows a variation of an aspect of the embodiments presented, and only differences will be discussed in detail.

DETAILED DESCRIPTION

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Also, something may be shown or described as being to a first, second, third or the like should not be taken to imply a specific order, unless otherwise stated. Like reference numerals refer to like elements throughout.

Example implementations of the present disclosure are generally directed to a material tensioning system. Example implementations of the present disclosure may find use in a variety of industries, including, without limitation, the automotive, aerospace, marine, commercial, construction, medical, and other industry sectors.

An example implementation of a protective cover, or "cover," generally 100, for electrical cables, optical cables, hoses, tubing, piping, tension cables, etc., and with which methods as disclosed herein may be produced, is shown in detail in the attached figures.

Figure 1:
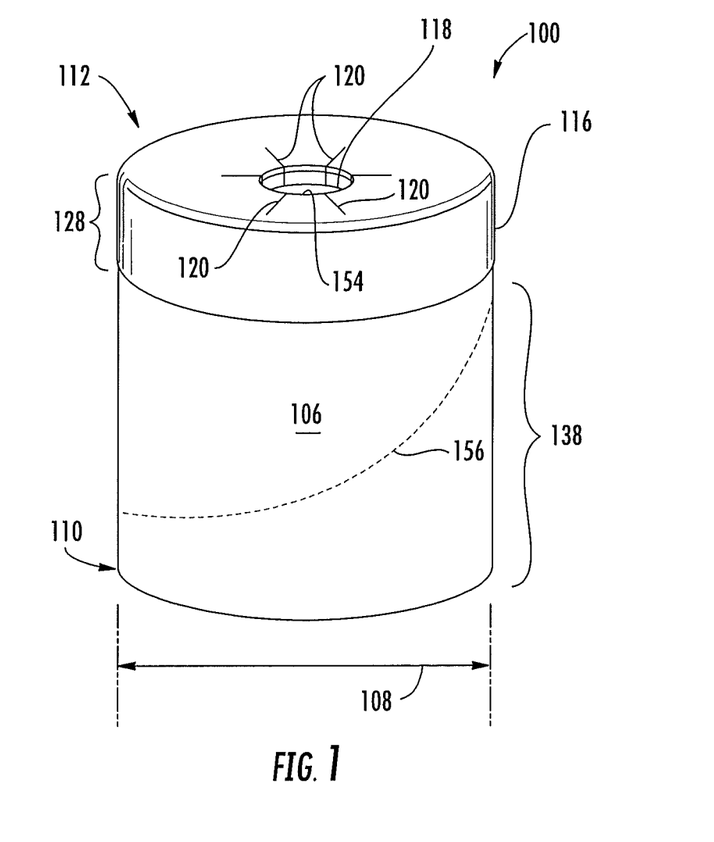
FIG. 1 is a perspective view of a protective cover for cable components according to at least one aspect of the disclosure.
Figure 2:
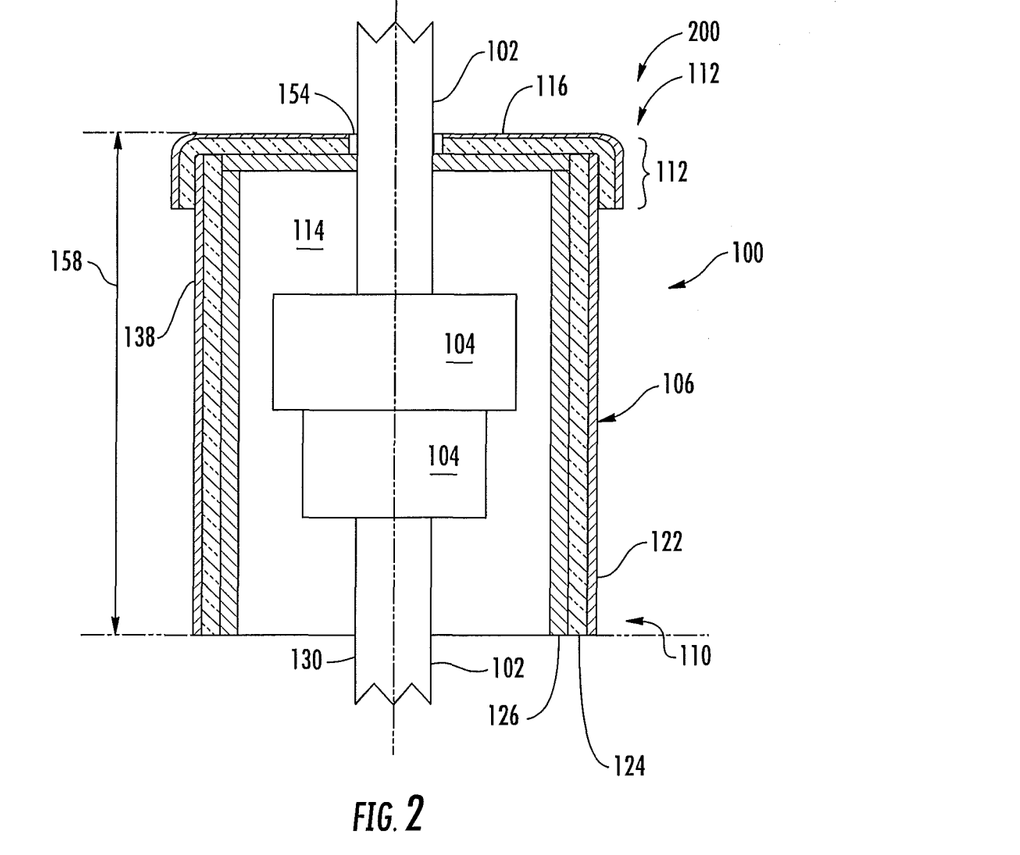
FIG. 2 is a side cross sectional view of a protective cover, according to at least one further example of the disclosure.

Referring first to FIGS. 1 and 2, according to at least one aspect of the disclosure, there is shown a protective cover 100 for protecting cable 102 and associated connectors, sensors, or other components, generally 104. Protective cover 100 comprises a tubular portion, or wall, or "tubular wall," 106 surrounding, or defining, an internal volume 114, tubular wall 106 having an outer diameter 108, a proximal end 110, and a distal end 112, and entirely covering, or substantially covering, outer bounds of internal volume 114 between open proximal end 110 and partially-closed distal end 112. It is to be understood that while tubular wall 106 is in one implementation generally cylindrical in shape, having a circular cross-section, it is not limited to such cylindrical shape and could be a variety of other shapes and/or cross-sections if desired. A cover, or cap, member 116 covers distal end 112 of tubular wall 106. Cap member 116 has a central opening 118 and slits 120 radiating outwardly from central opening 128. Tubular wall 106 and cap member 116 each comprise an outer metallic foil 122, a central flexible insulating material 124, and an inner soft lining material 126 (which may be non-marring to cable 102 jacketing or insulation upon contact with cable 102 and/or such jacketing or insulation) facing internal volume 114.

Flexible insulating material 124 may primarily comprise a suitable insulation material, such as fiberglass, in one implementation. In an example implementation, a 0.001 inch thick aluminum with a 2.8 ounce glass cloth bonded to one side could be satisfactory as a flexible insulating material 124. In one implementation, outer metallic foil 122 may primarily comprise aluminum. In one implementation, inner soft lining 126 may primarily comprise polyester felt. In one implementation, a nonwoven polyester felt could be used as a non-marring, inner soft lining material 126.

In one implementation of protective cover 100, cap member 116 has a diameter greater than outer diameter 118 of tubular wall 106. That portion of cap member 116 projecting beyond outer diameter 108 of tubular wall 106 when cap member 116 is placed against and centered over distal end 112 of tubular outer wall 106 comprises a folded portion 128 folded against and bonded to the outer surface of tubular outer wall 106. Cap member 116 has a diameter greater than outer diameter 118 only prior to folding the folded portion 128 against the outer surface of tubular wall 106. After folding, cap member 116 has a nominal diameter just greater than outer diameter 108, due to the contribution to overall thickness of folded portion 128. Bonding may be performed in any suitable way, such as by adhesives and/or heat welding, etc.

In one implementation of protective cover 100, tubular wall 106 is nominally generally cylindrical, particularly when not acted on by external forces, and has a central longitudinal axis 130 parallel to tubular wall 106. Cap member 116 is generally circular and substantially extends in a plane is generally perpendicular to central longitudinal axis 130. The cylindrical configuration of protective cover 100 may be configured to cooperate with commercially-produced connectors and/or sensors, etc., which in some cases may be of generally circular cross section, when taken at most points along the direction of conduction of current.

According to a further implementation of the disclosure, and referring particularly to FIG. 2, there is shown a cable component and protective cover assembly 200, comprising cable 102 (which could be an electrical and/or optical cable), a component 104 terminating cable 102, and protective cover 100 comprising tubular wall 106 surrounding internal volume 114. Tubular wall 106 has outer diameter 108, proximal end 110, and distal end 112. Tubular wall 106 entirely covers the outer bounds of internal volume 114 between open proximal end 110 and partially closed distal end 112. Protective cover 100 further comprises cap member 116 located at and covering distal end 112 of tubular outer wall 106. Cap member 116 has central opening 118 and slits 120 radiating outwardly from central opening 118. Tubular wall 106 and cap member 116 each comprise outer metallic foil 122, central flexible insulating material 124, and inner soft lining 126 facing internal volume 114. Tubular wall 106 of protective cover 100 is dimensioned and configured to receive electrical component 104 in close cooperation therewith. Cable 102 passes through central opening 118 of cap member 116. Cable component and protective cover assembly 100 may be thought of as a thermally protected electrical connection including either one of the two mating electrical components 104, such as connectors, and its associated cable 102, or alternatively, both of the two mating electrical components 104, such as electrical connectors, and both associated cables 102, in addition to protective cover 100. In motor vehicle engine/motor compartment applications, protective cover 100 may be used to shields connectors 104 from relatively high temperatures and/or vibrations.

Figure 3:
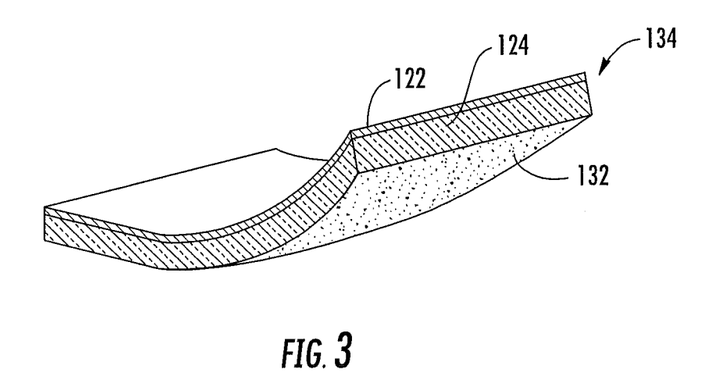
FIG. 3 is a perspective detail view of material used to fabricate the protective covers of FIGS. 1 and 2, according to at least one additional example of the disclosure.
Figure 4:
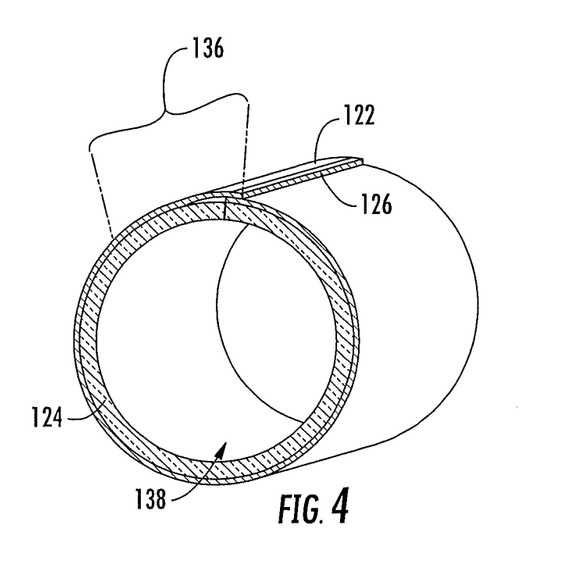
FIG. 4 is a perspective detail view showing a progressive stage in forming a protective cover from the material of FIG. 3.

According to still a further aspect of the disclosure, and referring additionally to FIGS. 3 and 4, there is shown a method of fabricating, for example from a prefabricated section of foil-backed fiberglass substrate (not shown), protective cover 100 for protecting jacketed cables 102 and associated connectors 104, wherein protective cover 100 has a final, or fabricated, configuration including a final, or fabricated, surface area, a final, or fabricated, length 158 (FIG. 2), a final, or fabricated, diameter, and central longitudinal axis 130 (FIG. 2). The method comprises laminating a prefabricated section of foil-backed fiberglass substrate to an adhesive 132, and cutting a patch, or template, or, pattern, 134 from the section of the foil-backed fiberglass substrate, pattern 134 having area slightly greater than the final surface area.

In one implementation, the method may further comprise forming pattern 134 into a tube 138 corresponding to the final diameter, and adhering a lapping portion 136 of the outer metallic foil 122 of the foil-backed fiberglass substrate to tube 138 in the final configuration. The method further comprises forming the section of the foil-backed fiberglass substrate into an end section 140, cutting central opening 118 into end section 140, placing end section 140 over an end (e.g., that end which becomes distal end 112) of tube 138, and bonding end section 140 to tube 138 to form the final configuration. Bonding may be performed in any suitable way, such as by heat welding and/or through use of adhesive. It should be noted that the final configuration, the final surface area, the final length, the final diameter, and central longitudinal axis 130 all refer to protective cover 100 in its finished state. The final configuration is, in the examples of FIGS. 1 and 2, that of a cylindrical tube, although it is to be understood that cover 100 could be of different shapes if desired and (although not shown) could include cross-sectional shapes such as a rectangle, oval, trapezoid, star, irregular shape, etc. and/or a shape form fitted to a component 104.

The prefabricated section of foil-backed fiberglass substrate refers to the prefabricated foil-backed fiberglass substrate product as it is provided by the supplier. This product is typically furnished in sheets and/or rolls of dimensions considerably greater than pattern 134. Pattern 134 is greater in one dimension than that of the finished tubular portion of protective cover 100 to allow for lapping portion 136, the latter used to seal the rolled formerly rectangular pattern 134 into tube 138 by adhesive 132. In one implementation, a high temperature acrylic adhesive could be used as adhesive 132.

In a further example of the method, forming pattern 134 into tube 138 corresponding to the final length and the final diameter comprises lining pattern 134 on an interior surface thereof with non-abrasive, inner lining 126, and not lining pattern 134 with inner lining 126 at lapping portion 136, thereby leaving adhesive 132 exposed for subsequent joining of lapping portion 136 to tube 138.

Adhesive 132 is shown in FIG. 3, but is omitted from view in FIG. 4 for visual clarity. Adhesive 132 is present in rolled tube 138 shown in FIG. 4, serving to adhere lapping portion 136 to tube 138.

It should further be noted that end section 140 is selected as a term that encompasses but is more generic than, cap member 116. Cap member 116 may be made from prefabricated foil-backed fiberglass substrate, with inner, non-abrasive, lining 126 bonded thereto, as a member separate from tube 138, or alternatively, as a single member which is part of the original section of prefabricated foil-backed fiberglass substrate with inner lining 126, wherein the single member comprises cap member 116 integral with tube 138. Bonding of inner lining 126 is accomplished by adhesive 132.

Figure 5:
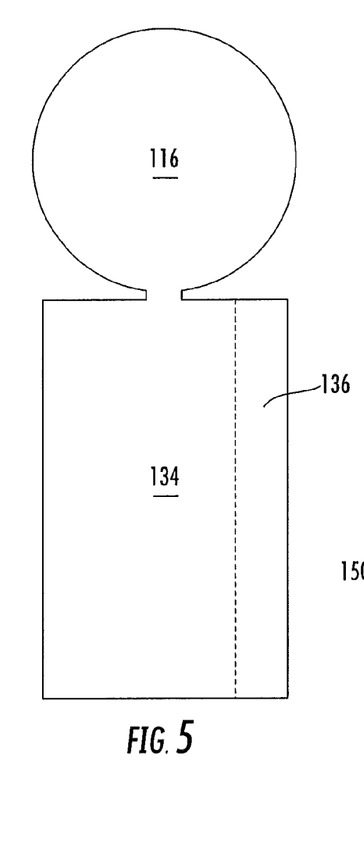
FIG. 5 is a plan view of a template or pattern for cutting material to fabricate a protective cover, according to still another example of the disclosure.

The first two examples are depicted in FIGS. 1-4. The latter situation is depicted in FIG. 5, which shows a pattern for the material (referring to both the prefabricated foil-backed fiberglass substrate, and also to inner lining 126) which will become cap member 116 and tube 138. However, as will be discussed hereinafter, end section 140 may be provided in still additional ways.

In another example of the method, forming pattern 134 into tube 138 corresponding to the final diameter, and adhering lapping portion 136 of the foil-backed fiberglass substrate to tube 138 in the final configuration further comprises forming pattern 134 into tube 138 by helically winding pattern 134. As seen in FIG. 1, a visible seam 156 oriented at an acute angle to longitudinal central axis 130 of protective cover 100 results from helically winding pattern 134.

In an example of the method, laminating the prefabricated section of the foil-backed fiberglass substrate to adhesive 132 comprises laminating the foil-backed fiberglass substrate to a pressure sensitive adhesive 132, and bonding end section 140 to tube 138 comprises pressing an overhang portion of end section 140 against tube 138.

Figure 6:
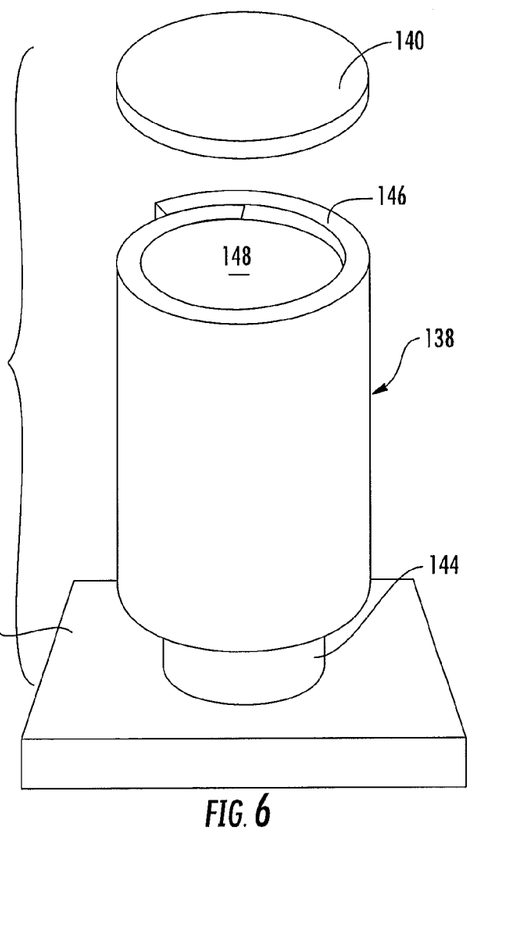
FIG. 6 is an exploded perspective view illustrating an aspect of fabricating a protective cover, according to yet another example of the disclosure.

Referring additionally to FIG. 6, in an example of the method, placing end section 140 over the end (e.g., that end which will become distal end 112 of protective cover 100) of tube 139 comprises supporting tube 138 on a close fitting cylindrical form 144 inside tube 138. In FIG. 6, an upper surface 146 of tube 138 and an upper surface 148 of form 144 are coplanar, to promote effective positioning of end section 140. Form 144 is depicted as being secured to a tabletop 150 or other sturdy object.

It should be noted at this point that orientational terms such as upper refer to the subject drawing as viewed by an observer. The drawing figures depict their subject matter in arbitrarily selected orientations of use, which could obviously change depending on how the depicted objects are supported or held. Therefore, orientational terms must be understood to provide semantic basis for purposes of description only, and do not imply that their subject matter can be used only in one position.

Turning again to FIGS. 1 and 2, in an example of the method, forming the section of the foil-backed fiberglass substrate into end section 140 comprises forming end section 140 to have a diameter slightly greater than a final diameter of protective cover 100, folding an overhang portion (folded portion 128, prior to folding) of end section 140 over an exterior of tube 138, and bonding the overhang portion of end section 140 to the exterior of tube 138. In a further example of the method, bonding the overhang portion of end section 140 to tube 138 comprises heat welding end section 140 to tube 138.

In another example of the method, cutting pattern 134 from the section of the foil-backed fiberglass substrate comprises cutting pattern 134 to have a dimension such that winding the section into tube 138 produces between ten percent and forty percent overlap along a circumference of tube 138.

Figures 7, 8:
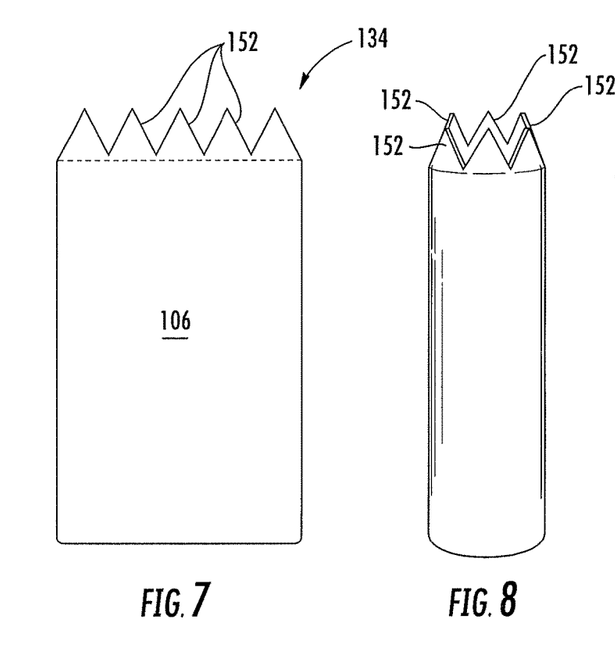
FIG. 7 is a plan view of another template or pattern for cutting material to fabricate a protective cover, according to still another example of the disclosure.
FIG. 8 is a perspective view showing a progressive stage of forming a protective cover cut from material according to the pattern of FIG. 7.
Figure 9:
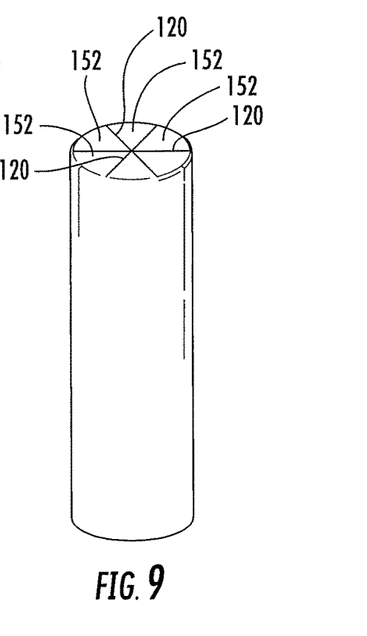
FIG. 9 is a perspective view of a further stage of forming a protective cover using the pattern of FIG. 7.
Figure 10:
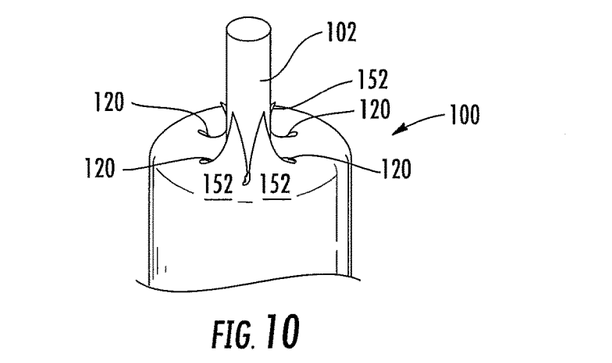
FIG. 10 is a perspective detail view of the top of the protective cover of FIG. 9, showing protrusion of a cable through the protective cover.

Turning now to FIGS. 7-10, in an example of the method, forming the section of the foil-backed substrate into end section 140 comprises forming pattern 134 into tube 138 corresponding to the final diameter and of length greater than the final length, cutting pointed teeth 152 into one end of tube 138 (or into pattern 134), and leaving an uncut portion (seen as tubular wall 106 in FIG. 7) equal in length to the final length of protective cover 100. The method further comprises folding pointed teeth 152 together such that slits 120 are between adjacent teeth 152, and bonding pointed teeth 152 together along a portion of each one of slits 120. FIG. 7 shows a pattern into which the section of the foil-backed fiberglass substrate and material for inner lining 126 may be cut. FIG. 8 shows the cut material forming tube 138. FIG. 9 shows teeth 152 folded to occupy a plane perpendicular to longitudinal axis 130 (FIG. 2). FIG. 10 shows slits 120 bonded along a portion of each slit 120, with the bond shown exaggerated for clarity. Bonding may be performed by heat sealing. Slits 120 are bonded along only a portion of each slit 120 to enable the innermost portion of each tooth 152 to deflect as shown in FIG. 10 when a cable 102, which could be jacketed, is pushed past teeth 152. In this example, there is no separate or discrete cap member such as cap member 116. Rather, the folded teeth 152 form end section 140. Also, an implementation of the present disclosure may include heating a circumference of the tube after the teeth have been folded to substantially join at least two of the teeth 152 together, and more specifically may include, heating the outside top corner circumference of tube 138 after teeth 152 have been folded to form a generally rigid end section 140.

In an example of the method, cutting central opening 118 into end section 140 comprises cutting radiating slits 120 into end section 140. Slits 120 may be used exclusively to form central opening 118, as shown in FIGS. 7-10, may supplement a hole 154 punched or otherwise formed in cap member 116 (as in the example of FIG. 1), or may be entirely replaced by hole 154 (as in the example of FIG. 2). Hole 154 easily passes jacketed cable 102. Use of hole 154 in the absence of slits 120 tends to keep cap member 116 closed snugly, thereby obstructing ready entry of heat to internal volume 114.

In another example, and as seen in FIG. 2, the method further comprises locating central opening 118 in alignment with central longitudinal axis 130 of protective cover 100. This generally centers cable(s) 102 and connector(s) 104 within protective cover 100, thereby minimizing chafing of protective cover 100.

In a further example of the method, forming pattern 134 in tube 138 corresponding to the final length and the final diameter comprises lining pattern 134 on an interior surface thereof with inner lining 126.

In yet another example of the method, forming the section of the foil-backed fiberglass substrate into end section 140 comprises lining end section 140 on an interior surface with inner lining 126. Where end section 140 comprises cap member 116, a diameter of inner soft lining 126 will be less than an inner diameter of tube 138, so that inner soft lining 126 easily enters internal volume 114 and fits in close cooperation with surrounding tube 138. This is shown in FIG. 2.

Referring to the pattern shown in FIG. 5, in another example of the method, cutting pattern 134 from the section of the foil-backed fiberglass substrate and forming the section of the foil-backed fiberglass substrate into end section 140 comprise cutting pattern 134 and end section 140 from the section of the foil-backed fiberglass as a single piece.

In still another example of the method, cutting pattern 134 and end section 140 from the section of the foil-backed fiberglass as a single piece comprises die cutting pattern 134 and end section 140 from the section of the foil-backed fiberglass substrate as a single piece. Die cutting can potentially result in very accurate reproduction of desired shapes and contours from laminated strata such as the foil-backed fiberglass substrate and felt material constituting inner soft lining 126.

In a non-limiting example implementation reflecting an actual automotive application, protective cover 100 may be fabricated using the following dimensions. The foil-backed fiberglass substrate may be cut into strips of width of approximately 51 millimeters. The felt may be approximately 2.5 millimeters thick, and be cut into strips of width of approximately 38 millimeters. The felt may be wound to the form of tube 138 with a butt lap, tube 138 having an approximately 25 millimeter internal diameter. As the foil-backed fiberglass substrate is wound to form tube 138, lapping portion 136 may extend along a circumference of tube 138 by approximately 12-13 millimeters. A protective cover 100 will result which will accommodate in close cooperation therewith a component 104 of 25 millimeter diameter.

In the following description, numerous specific details are set forth in order to provide an understanding of the present invention. It will be apparent, however, to one skilled in the art that the present invention may be practiced without these specific details. Thus, the specific details set forth are merely exemplary. The specific details may be varied from and still be contemplated to be within the scope of the present invention. Although specific terms are employed herein, they are used in a generic and descriptive sense only and not for purposes of limitation.

While the disclosed concepts have been described in connection with what is considered the most practical and preferred implementation, it is to be understood that the disclosed concepts are not to be limited to the disclosed arrangements, but are intended to cover various arrangements which are included within the scope of the broadest possible interpretation of the appended claims so as to encompass all modifications and equivalent arrangements which are possible.

Therefore, it should be understood that the various examples of the apparatus(es) disclosed herein may include any of the components, features, and functionalities of any of the other examples of the apparatus(es) disclosed herein in any feasible combination, and all of such possibilities are intended to be within the scope of the present disclosure. Many modifications of examples set forth herein will come to mind to one skilled in the art to which the present disclosure pertains having the benefit of the teachings presented in the foregoing descriptions and the associated drawings.

What is claimed is:

1. A method of fabricating from a section of a foil-backed fiberglass substrate a protective cover for protecting at least one cable or at least on component attached to the cable, wherein the fabricated protective cover includes a fabricated surface area, a fabricated length, a fabricated diameter, and a central longitudinal axis, the method comprising:
   laminating the section of the foil-backed fiberglass substrate to an adhesive;
   cutting a pattern from the section of the foil-backed fiberglass substrate, the pattern having area slightly greater than the fabricated surface area;
   forming the pattern into a tube corresponding to the fabricated diameter;
   adhering a lapping portion of the foil-backed fiberglass substrate to the tube;
   forming the foil-backed fiberglass substrate into an end section;
   cutting a central opening into the end section;
   placing the end section over an end of the tube; and
   bonding the end section to the tube to form the fabricated protective cover.

2. The method of claim 1, wherein placing the end section over the end of the tube comprises supporting the tube on a close-fitting generally cylindrical form inside the tube.

3. The method of claim 1, wherein forming the foil-backed fiberglass substrate into the end section comprises:
   forming the end section to have a diameter slightly greater than the fabricated diameter;
   folding an overhang portion of the end section over an exterior of the tube; and
   bonding the overhang portion of the end section to the exterior of the tube.

4. The method of claim 3, wherein bonding the overhang portion of the end section to the exterior of the tube comprises heat welding the end section to the tube.

5. The method of claim 1, wherein cutting the pattern from section of the foil-backed fiberglass substrate comprises cutting the pattern to have a dimension such that winding the section into a tube produces between ten percent and forty percent overlap along a circumference of the tube.

6. The method of claim 1, wherein
   laminating the prefabricated section of the foil-backed fiberglass substrate to an adhesive comprises laminating the foil-backed fiberglass substrate to a pressure sensitive adhesive; and
   bonding the end section to the tube comprises pressing an overhang portion of the end section against the tube.

7. The method of claim 1, wherein cutting a central opening into the end section comprises cutting slits in the end section extending generally radiating outwardly from the central opening.

8. The method of claim 7, wherein forming the section of the foil-backed fiberglass substrate into the end section comprises:
   forming the pattern into a tube corresponding to the fabricated diameter and of length greater than the fabricated length;
   cutting teeth into one end of the tube, leaving an uncut portion substantially equal in length to the fabricated length of the protective cover;
   folding the teeth together such that slits are between adjacent teeth; and
   bonding the teeth together along a portion of each of the slits.

9. The method of claim 7, wherein forming the section of the foil-backed fiberglass substrate into the end section comprises:
   forming the pattern into a tube corresponding to the fabricated diameter and of length greater than the fabricated length;
   cutting teeth into one end of the tube, leaving an uncut portion substantially equal in length to the fabricated length of the protective cover;
   folding the teeth together such that slits are between adjacent teeth; and
   heating a circumference of the tube after the teeth have been folded to substantially join at least two of the teeth together.

10. The method of claim 1, wherein forming the pattern into the tube corresponding to the fabricated length and the fabricated diameter comprises lining the pattern on an interior surface thereof with an inner lining.

11. The method of claim 1, wherein forming the section of the foil-backed fiberglass substrate into the end section comprises lining the end section on an interior surface with an inner lining.

12. The method of claim 11, wherein cutting the pattern and the end section from the section of the foil-backed fiberglass as a single piece comprises die cutting the pattern and the end section from the section of the foil-backed fiberglass substrate as a single piece.

13. The method of claim 1, wherein cutting the pattern from the section of the foil-backed fiberglass substrate and forming the section of the foil-backed fiberglass substrate into the end section comprise cutting the pattern and the end section from the section of the foil-backed fiberglass as a single piece.

14. The method of claim 1, wherein forming the pattern into a tube corresponding to the fabricated diameter, and adhering a lapping portion of the foil-backed fiberglass substrate to the tube in the fabricated protective cover further comprises forming the pattern into a tube by helically winding the pattern.

15. The method of claim 1, wherein forming the pattern into the tube corresponding to the fabricated length and the fabricated diameter comprises:
   applying a soft lining to the adhesive on an interior surface of the pattern; and
   configuring the lapping portion such that the adhesive is exposed for subsequent joining of the lapping portion to the tube.

* * * * *

UNITED STATES PATENT AND TRADEMARK OFFICE
CERTIFICATE OF CORRECTION

PATENT NO. : 9,716,375 B1
APPLICATION NO. : 15/014754
DATED : July 25, 2017
INVENTOR(S) : Michael E. Lester et al.

It is certified that error appears in the above-identified patent and that said Letters Patent is hereby corrected as shown below:

In the Claims

In Column 10, Line 12, in Claim 13, please change "claim 1" to "claim 11".

Signed and Sealed this
Twenty-fourth Day of October, 2017

Joseph Matal
*Performing the Functions and Duties of the
Under Secretary of Commerce for Intellectual Property and
Director of the United States Patent and Trademark Office*